US012640562B2

(12) United States Patent
Henselmeyer

(10) Patent No.: US 12,640,562 B2
(45) Date of Patent: May 26, 2026

(54) METHOD AND CENTRAL COMPUTER ARRANGEMENT FOR PREDICTING A GRID STATE, AND COMPUTER PROGRAM PRODUCT

(71) Applicant: Siemens Aktiengesellschaft, Munich (DE)

(72) Inventor: Sylwia Henselmeyer, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 407 days.

(21) Appl. No.: 17/865,600

(22) Filed: Jul. 15, 2022

(65) Prior Publication Data

US 2023/0018146 A1    Jan. 19, 2023

(30) Foreign Application Priority Data

Jul. 15, 2021    (EP) ..................................... 21185716

(51) Int. Cl.
H02J 3/00          (2026.01)
G05B 19/042          (2006.01)
(Continued)

(52) U.S. Cl.
CPC ............ H02J 3/004 (2020.01); G05B 19/042 (2013.01); H02J 3/0014 (2026.01); H02J 3/003 (2020.01);
(Continued)

(58) Field of Classification Search
CPC .... H02J 3/004; H02J 3/003; H02J 3/24; H02J 3/381; H02J 2300/20; H02J 3/0012;
(Continued)

(56) References Cited

U.S. PATENT DOCUMENTS

2011/0112698 A1* 5/2011 Edwards ................ G05B 17/02
                                                                    700/291
2013/0204812 A1* 8/2013 Sterzing ................. G06N 20/00
                                                                    706/12
(Continued)

FOREIGN PATENT DOCUMENTS

DE          4323432 A1    1/1994
JP          H0956070 A    2/1997

OTHER PUBLICATIONS

M. Manbachi et al. "Predictive algorithm for Volt/VAR optimization of distribution networks using Neural Networks," 2014 IEEE 27th Canadian Conference on Electrical and Computer Engineering (CCECE), Toronto, ON, Canada, 2014, pp. 1-7, doi: 10.1109/CCECE.2014.690101 (Year: 2014).*

(Continued)

*Primary Examiner* — Rami R Okasha
(74) *Attorney, Agent, or Firm* — Laurence A. Greenberg; Werner H. Stemer; Ralph E. Locher

(57)          ABSTRACT
A method predicts a grid state of an electrical power distribution grid, in which a central computer arrangement is used to receive measured values from measuring devices. A state estimation device is used to predict a future grid state, wherein the prediction of the future grid state is taken as a basis for ascertaining measures to guarantee stability of the power distribution grid. The prediction is made for multiple times within a predefined time window. A first prediction device is used to ascertain a prediction for a first portion of the multiple times on the basis of a voltage var control method, and in that a second prediction device is used to ascertain a prediction for a second portion of the multiple times on the basis of a neural network method.

18 Claims, 2 Drawing Sheets

(51) Int. Cl.
  *H02J 3/0014* (2026.01)
  *H02J 3/38* (2026.01)
  *H02J 101/20* (2026.01)

(52) U.S. Cl.
  CPC ...... *H02J 3/381* (2013.01); *G05B 2219/2639*
  (2013.01); *H02J 2101/20* (2026.01)

(58) Field of Classification Search
  CPC ............ H02J 13/00004; H02J 2203/10; G05B
  19/042; G05B 2219/2639; G06N 3/042;
  G06N 3/08
  See application file for complete search history.

(56) References Cited

U.S. PATENT DOCUMENTS

| | | | | |
|---|---|---|---|---|
| 2014/0244065 | A1* | 8/2014 | Biswas | H02J 3/06 |
| | | | | 700/298 |
| 2019/0228481 | A1* | 7/2019 | Tella | G06Q 50/06 |
| 2021/0373518 | A1* | 12/2021 | Spalt | G06Q 50/06 |
| 2022/0083445 | A1* | 3/2022 | Nyati | G06F 11/3452 |
| 2022/0294216 | A1* | 9/2022 | Carr | G06N 3/044 |
| 2023/0236560 | A1* | 7/2023 | Lee | H02J 13/00001 |
| | | | | 700/291 |
| 2025/0139717 | A1* | 5/2025 | Poonja | H02J 3/003 |

OTHER PUBLICATIONS

Wikipedia Article "SCADA": https://en.wikipedia.org/w/index.php?title=SCADA&oldid-858433181, Sep. 7, 2018.
Dzafic et al.: "Real-Time Distribution System State Estimation" (2010 IEEE 978-I-4244-7398-4/10).
Dzafic et al.: "Real-Time Estimation of Loads in Radial and Unsymmetrical Three-Phase Distribution Networks" IEEE Transactions on Power Systems, vol. 28, No. 4, Nov. 2013.
Siemens Ingenuity for life Broschure: "Intelligent control center technology—Spectrum Power—The Smart Grid—Constant Energy in a World of Constant Change" Siemens AG 2017, Article-No. EMDG-B90019-00-7600.
Siemens Ingenuity for life Broschure: "Spectrum Power Active Network Management—Stable grid operation through targeted monitoring and fast control", Siemens AG 2016, EMDG-B10104-00-7600.

* cited by examiner

FIG 1
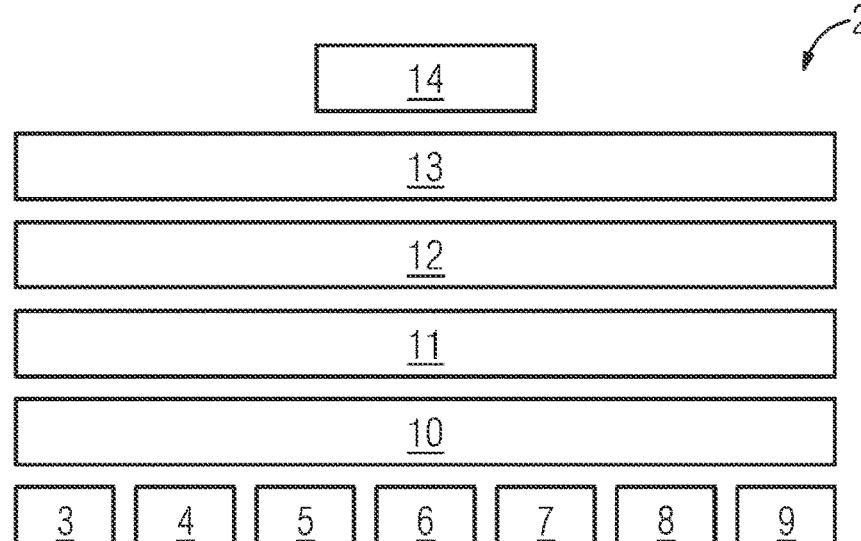
FIG 2
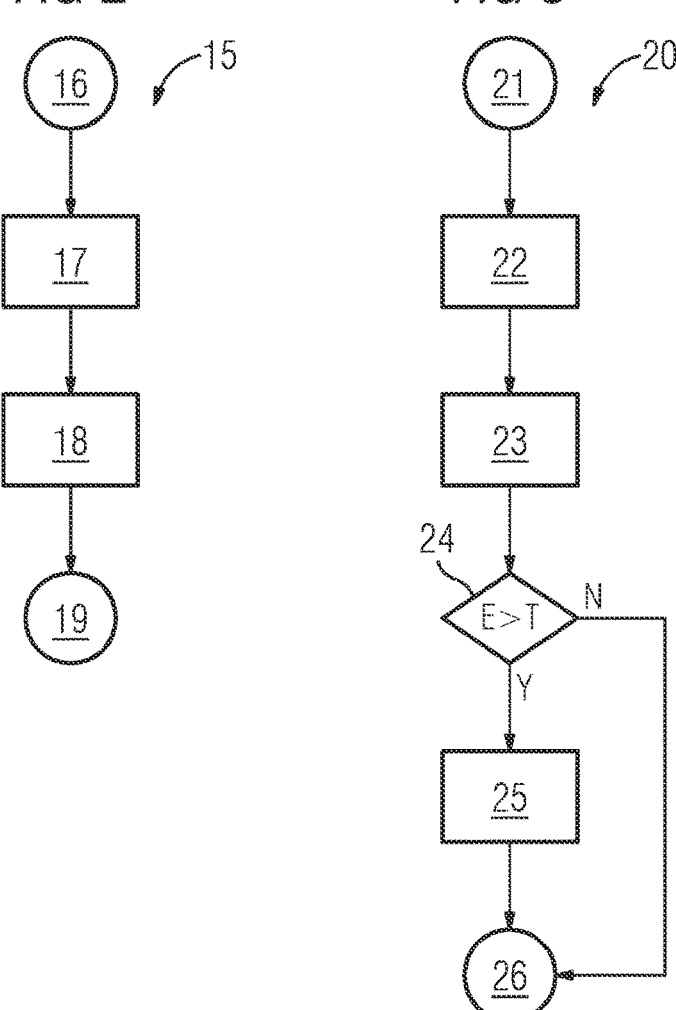
FIG 3
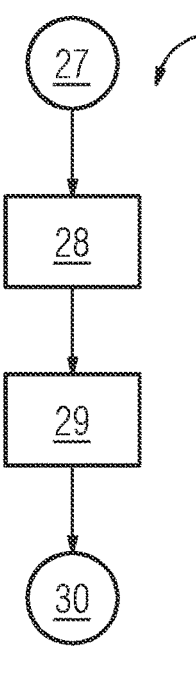
FIG 4

METHOD AND CENTRAL COMPUTER ARRANGEMENT FOR PREDICTING A GRID STATE, AND COMPUTER PROGRAM PRODUCT

CROSS-REFERENCE TO RELATED APPLICATION

This application claims the priority, under 35 U.S.C. § 119, of European Patent Application EP 21185716.4, filed Jul. 15, 2021; the prior application is herewith incorporated by reference in its entirety.

FIELD AND BACKGROUND OF THE INVENTION

The invention relates to a method for predicting a grid state, a central computer arrangement for predicting a grid state and a computer program product.

The product brochure "Intelligent Control Center Technology—Spectrum Power", Siemens AG 2017, Article No EMDG-B90019-00-7600, discloses software for what is known as a "Supervisory Control and Data Acquisition (SCADA)" system, that is to say a control center. SCADA systems have been known for a long time for monitoring and controlling power transmission grids (See, for example, the Wikipedia article entitled "SCADA"). They involve measured values from sensors, for example from voltage measuring units and current measuring units in the power transmission grid, being aggregated and transmitted to the control center. To control circuit breakers and isolators in the power transmission grid and to actuate energy producers such as power stations, control commands are sent to the power transmission grid. These control commands are received and processed by "remote terminal units" (RTUs), "programmable logic controllers" (PLCs) and "intelligent devices" (IEDs) in order to actuate the circuit breakers and the isolators, etc. To date, there has often been provision in the control center for a local computer center on which the control center software, such as e.g. Spectrum Power, runs. Engineers who are able to monitor the displays of the SCADA relating to the present operating state of the power transmission grid and, in the event of a fault, to take countermeasures, such as e.g. shutting down a grid section, are provided in the control center around the clock. The control center software is generally operated in a central computer arrangement, which may be in the form of a computer center with processors, data memories and screens, for example. The term "central" in this context is intended to mean that all measurement data from the power transmission grid and all control commands for the power transmission grid are processed centrally.

An accompanying phenomenon of ever wider use of distributed energy production, that is to say for example by photovoltaic installations or wind power installations, is that the ever more numerous local energy producers supplying to the low-voltage and medium-voltage grid make predicting a system state of the power transmission grid more difficult. Dependency on weather influences also increases, e.g. because solar cells are heavily influenced by cloud cover and wind power installations by wind strength. These problems also have repercussions for the next-highest voltage level of a power transmission grid on the high-voltage level, which is therefore more difficult to control and to predict.

To date, load and production forecasts and/or schedules have generally been used in conjunction with what is known as a "distribution system power flow (DSPF)" to assess a future grid state. DSPF uses static equipment data and local predictions for energy consumption and energy production and also dynamic topology information (i.e. which lines are currently connected between the individual components) to compute a forecast voltage absolute value and voltage angle on each network section. Such an approach is known for example from the product brochure "Spectrum Power Aktives Netzwerkmangement", Siemens AG 2016, EMFG-B10104-00. The technical principles are known from the publications "Real-Time Distribution System State Estimation" from Dzafic et al., 2010 IEEE 978-1-4244-7398-4 and "Real-Time Estimation of Loads in Radial and Unsymmetrical Three-Phase Distribution Networks" from Dzafic et al., 2013 IEE 0885-8950.

Network operators in Germany are for example obliged to provide predictions about a vertical grid load and about a supply of regenerative energy (from e.g. photovoltaic installations, biogas installations, wind power installations, geothermal installations, etc.) for a future period of 24 hours at a temporal resolution of 15 minutes. On the basis of the predictions, the network operators estimate the future grid state and ascertain suitable measures to safeguard grid stability (i.e. countermeasures, e.g. in order to prevent limit value contraventions for voltage and frequency in a subsystem). By way of example, the aim is to ascertain whether and if so when flexible power needs to be bought in or sold as a measure in the next 24 hours.

These predictions may be ascertained for example by means of analytical algorithms such as state estimation or a voltage var control (VVC) method for 96 times, i.e. every 15 minutes for 24 hours in the future, the particular computation being performed separately for each distribution grid. However, a high processing power is needed constantly for this, even though the results ultimately barely differ for most times. Experiments have shown that for a model grid the operating time for a prediction for all 96 times in the next 24 hours lasts for 20 minutes. This is too long, since an up-to-date result for the next 24 hours should be available before the next interval of 15 minutes begins and a new prediction for 24 hours is needed. This problem would be able to be solved in the past only by way of massive expansion of the computing capacity of a control center, e.g. by providing new servers having powerful processors. This is expensive, however, and increases the energy consumption of the control center.

SUMMARY OF THE INVENTION

Based on known methods for predicting a grid state of an electrical power distribution grid, the object of the invention is to specify a method that may be used to estimate a future system state of the power distribution grid comparatively easily and quickly.

The invention achieves this object by way of a method according to the independent method claim.

It is a fundamental concept of the invention to combine an artificial neural network with an analytical optimization method in order to speed up the computation of the results. A fundamental advantage of the invention in this case is that results for the prediction may be provided at any time in the time window before the next time is reached. By way of example, a result can be attained in less than 15 minutes when the interval of time between the times is 15 minutes, with the result that a new iteration of the computation for the time window can be initiated again at the next time (because the processing power has already been released again at this time). A further advantage is that processing power, or CPU use time, is not used to compute very similar results from analytical computations for each time in full as previously. Furthermore, no new hardware components are needed, i.e. no massive expansion of the processing power of a central computer arrangement of the control center is required. This saves costs, installation space and operating costs such as electricity costs. Additionally, no complex software architecture is needed.

A grid state in the context of the invention comprises for example an indication of the voltage absolute value, or a voltage, and the voltage angle, or phase angle, on each network section. A network section is e.g. also referred to as a "network bus" in the context of the "bus-branch" model. It serves as a grid model connecting point at which modelled equipment of the electrical grid such as lines, transformers, consumers and producers of electrical energy may be linked.

A central computer arrangement contains for example processors, data memories and screens. The term central in this context is intended to mean that all essential measurement data from the power transmission grid and all essential control commands for the power transmission grid are processed centrally. The central computer arrangement may contain multiple computer components that perform different functions. There may be provision for e.g. a state estimation device for predicting a future grid state, and also a first and a second prediction device, which use different methods, or algorithms, for state estimation.

The computer arrangement, or the control center software, may also be produced partly or completely as a cloud application, that is to say a server arrangement with locally distributed resources for data processing and data storage that are connected by way of a data network, such as e.g. the Internet.

A voltage var control method is e.g. what is known as volt var control for control center systems. The control of voltage and wattless power in a power transmission grid has been known by the term "volt VAr control" for a long time and is described for example on Wikipedia (See the Wikipedia article entitled "Distribution management system"). Load tap changers are essentially controlled for transformers, voltage regulators and capacitor banks. Capacitor banks may be used for supplying wattless power to the grid and are therefore particularly suitable for volt VAr control.

A neural network method in the context of the invention is a machine-learning method in which training data are taken as a basis for teaching a neural network to deliver a suitable output to an input, i.e. for example to take measurement data as a basis for delivering a prediction of a future grid state.

A time window is e.g. a period in the future that extends from the present time for several hours into the future, that is to say e.g. from now to the next 24 hours. The multiple times within the predefined time window may be e.g. at even intervals from one another, that is to say e.g. may occur every 15 minutes.

Measuring devices may be for example voltage measuring units, current measuring units, phase measuring units, or "phasor measurement units (PMUs)", "remote terminal units" or intelligent electricity meters, or "smart meters", "intelligent electrical devices (IEDs)" for monitoring switches and other equipment, control devices e.g. for intelligent substations or protective units. The data transmission of the measurement data may take place e.g. based on the IEC 61850 protocol or based on the Internet Protocol. Data may be transmitted using Powerline Communication via the electricity grid, or by radio, e.g. by LTE (4G), or by cable, such as e.g. Ethernet or optical fiber. Measured values may thus comprise e.g. voltage values, current intensity values, etc.

Measures are used e.g. to avoid limit value contraventions. By way of example, a predefined voltage band of +/−10% around the envisaged rated voltage may be provided with an upper and a lower limit value. If the predicted voltage exceeds or falls short of these limit values or there is even the threat of a power failure, it is accordingly necessary to take a measure in the present. By way of example, a predefined frequency band of +/−1% around the envisaged rated frequency may be provided with an upper and a lower limit value.

A measure in the context of the invention is for example a reduction in the consumption of an individual consumer or a group of consumers or a reduction in the supply power of an energy producer or a group of energy producers or a change in a schedule for a consumer or producer of electrical energy. By way of example, applicable control commands relating to setpoint values may be sent to an applicable piece of equipment in the power transmission grid.

In a preferred embodiment of the method according to the invention, a high-voltage grid is used for at least part of the power distribution grid. A high-voltage grid has e.g. a rated voltage of above 52 kV.

In a further preferred embodiment of the method according to the invention, a medium-voltage grid is used for at least part of the power distribution grid. A medium-voltage grid has e.g. a rated voltage of above 1 kV to 52 kV.

In a preferred embodiment of the method according to the invention, a low-voltage grid is used for at least part of the power distribution grid. A low-voltage grid has e.g. a rated voltage of below 1 kV. This is an advantage because predicting the grid state is particularly problematic on this voltage level owing to the large number of energy consumers and producers.

In a further preferred embodiment of the method according to the invention, the prediction has no more than a divergence of 10% on average from the grid state that is actually determined later. The divergence of no more than 10% on average can be understood as what is known as a "mean average percentage error (MAPE)" of 10%, for example.

In a further preferred embodiment of the method according to the invention, at least some of the measuring devices are arranged in substations. In the context of the invention, a substation is a transformer substation, or a local grid transformer station. This embodiment has the advantage that the measurements of a substation already indicate a sum of the influences of numerous consumers and producers of electrical energy, with the result that overall a less error-prone method can be expected than when every single connecting point of a producer or consumer on a network section is taken into consideration.

In a further preferred embodiment of the method according to the invention, a network load is ascertained for the prediction. This is an advantage because the network load has a direct influence on grid stability, i.e. on maintenance of voltage values and frequency values that are required for the power transmission grid to operate properly.

In a further preferred embodiment of the method according to the invention, an energy production by producers of renewable energy is ascertained for the prediction. This is an advantage because feeding in renewable electrical energy by producers is very volatile and has a direct influence on grid stability, i.e. on maintenance of voltage values and frequency values that are required for the power transmission grid to operate properly.

The grid load and/or the energy production by producers of renewable energy allow advance assessment of whether for example electrical energy needs to be bought in or sold at a future time within the next 24 hours. Alternatively, production of electrical energy may also be restricted or increased. Furthermore, consumption of electrical energy at the required time may also be lowered or raised by influencing controllable consumers.

In a further preferred embodiment of the method according to the invention, several hours in the future are taken into consideration for the predefined time window, each of the multiple times being at time intervals of between 3 and 60 minutes. Selection of the temporal resolution makes it possible to guarantee, inter alia, that the processing power required for the next iteration has already been released again at the next time.

In a further preferred embodiment of the method according to the invention, 24 hours in the future are taken into consideration for the predefined time window, each of the multiple times being at time intervals of 15 minutes. This arrangement is particularly important because it is required by many operators.

In a further preferred embodiment of the method according to the invention, a first training device is used to create training data, wherein multiple contraventions of predefined threshold values for measured values of the electrical power distribution grid are simulated, and the training data are taken as a basis for using the first prediction device to ascertain a first prediction training dataset. In other words, a virtual replica of the power transmission grid to be monitored is taken as a basis for computing many different problematic scenarios beforehand in order to provide a large set of different operating situations.

In a further preferred embodiment of the method according to the invention, the training data are taken as a basis for using the second prediction device to ascertain a second prediction training dataset, and a comparison device is used to ascertain a diversity value for a difference between the first and second prediction training datasets, wherein, if the diversity value exceeds a previously stipulated threshold value, a second training device is used to train a neural network for the second prediction device in such a way that the diversity value is reduced. In other words, the prediction training dataset ascertained in the aforementioned embodiment is used to train a neural network on the basis of the many simulated different operating situations so that it delivers comparable results for simulation. This is an advantage of the invention, because the neural network is guaranteed to be able to predict usable situations, i.e. situations that occur in reality, sufficiently accurately. The aim of the training is for the diversity value after the training of the neural network to be below the threshold value, i.e. to be sufficiently similar, during a new pass. To achieve this, parameters of the neural network may be changed experimentally and the changed grid used to test whether the diversity value decreases.

Furthermore, the object of the invention, based on known central computer arrangements for predicting a grid state of an electrical power distribution grid, is to specify a central computer arrangement that may be used to estimate a future system state of the power distribution grid comparatively easily and quickly.

The invention achieves this object by way of a central computer arrangement. Preferred embodiments emerge from the subclaims. In this case, the same advantages as explained for the method according to the invention at the outset are obtained mutatis mutandis.

Based on known methods for predicting a grid state of an electrical power distribution grid, the object of the invention is to specify a computer program product that may be used to estimate a future system state of the power distribution grid comparatively easily and quickly.

The invention achieves this object by way of a computer program product. In this case, the same advantages as explained for the method according to the invention at the outset are obtained mutatis mutandis.

Other features which are considered as characteristic for the invention are set forth in the appended claims.

Although the invention is illustrated and described herein as embodied in a method and a central computer arrangement for predicting a grid state, and a computer program product, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE FIGURES

FIG. 1 is an illustration showing an example of an architecture of a neural network'

FIG. 2 is a flow diagram showing an approach for creating training data;

FIG. 3 is a flow diagram showing an example of training of a neural network with training data;

FIG. 4 is a flow diagram showing an example of prediction of a grid state.

DETAILED DESCRIPTION OF THE INVENTION

Figure 5:
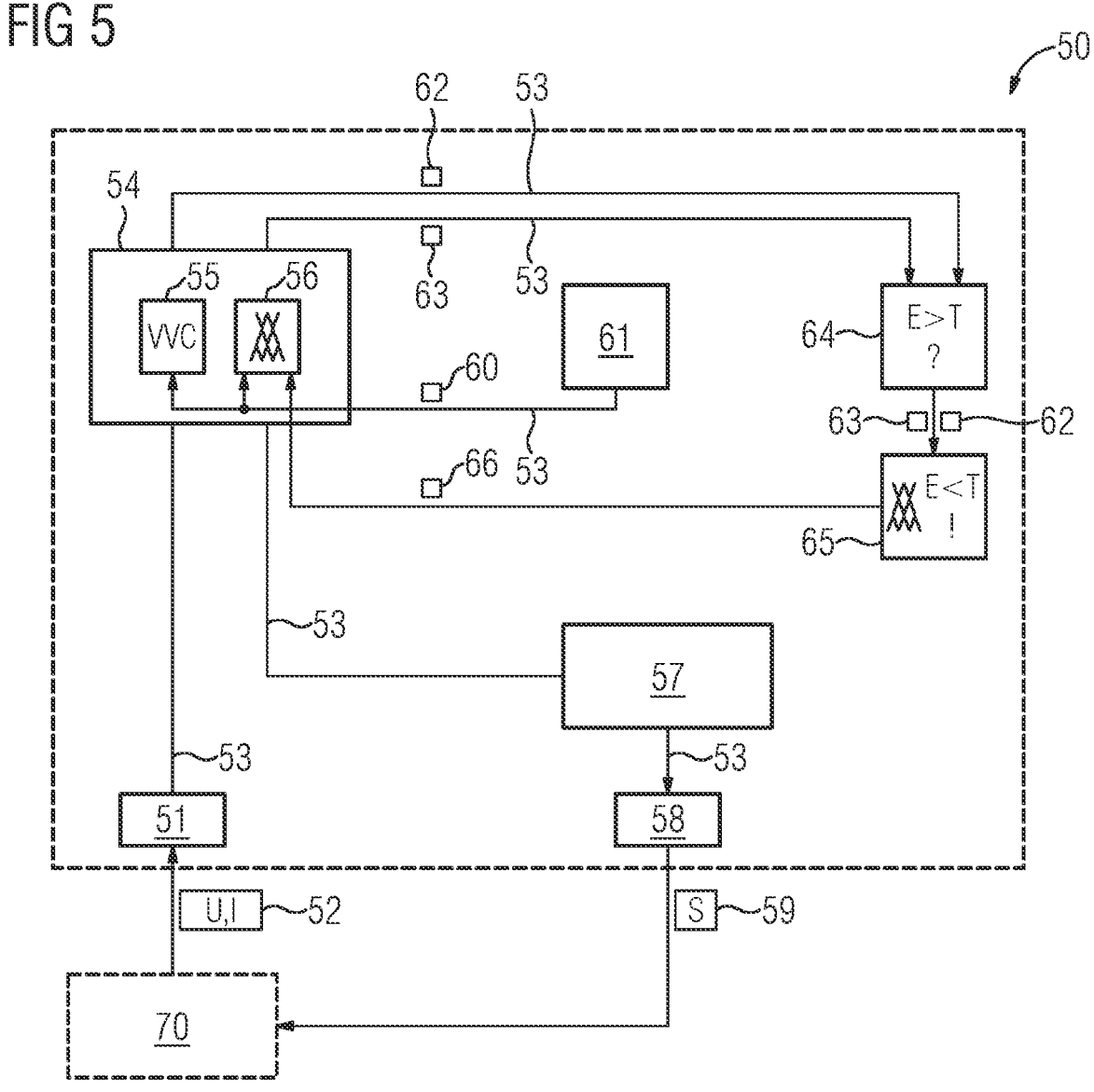
FIG. 5 is a block diagram showing an exemplary embodiment of a central computer arrangement.

Referring now to the figures of the drawings in detail and first, particularly to FIG. 1 thereof, there is shown a simple example of a software architecture of a neural network method, as may be used in the second prediction device. Input values 3-9 are transferred to a first layer 10 of the neural network. The processing takes place using further layers 11-13. Finally, output variables 14 are provided.

Input values are e.g.:

limit value contraventions 3 for powers or voltages transmitted by remotely monitored transformers, initial control positions 4 for controllable equipment such as load tap changers of transformers or switchgear, sum of injected wattless power 5 from capacitors, sum of the power 6 of the load, sum of the wattless power 7 of the load, sum of the energy production 8, and sum of the wattless power from energy producers 9.

Output variables 14 comprise e.g. all final control positions for controllable equipment such as e.g. load tap changers of transformers or switchgear.

FIG. 2 shows an example of a method 15 for creating training data for the neural network shown in FIG. 1. After the starting step 16, the simulation step 17 involves multiple contraventions of predefined threshold values for measured values of the electrical power distribution grid being simulated and being provided as training data. In step 18, the training data are processed by means of an analytical method such as e.g. volt var control in the first prediction device. In step 19, the input values for the analytical method, that is to say the training data containing measured values and limit value contraventions, and also the output values from the analytical method, that is to say a particular estimated grid state, are provided as a first prediction training dataset.

FIG. 3 shows an example of a method 20 for training the neural network 15 shown in FIG. 1. After the starting step 21, the first prediction step 22 involves the training data being taken as a basis for ascertaining a first prediction training dataset, which also includes output values from the analytical method. This step may also be skipped if a grid state has already been estimated in step 18 in FIG. 2 by means of an analytical method.

In the second prediction step 23, a second prediction training dataset is ascertained, the neural network from FIG. 1 being used. Exactly the same input values containing the training data are used in this case as for the analytical method previously.

In comparison step 24, a diversity value E is ascertained for a difference between the first and second prediction training datasets. If the diversity value E exceeds a previously stipulated threshold value T, i.e. there is an excessively large divergence between the two estimated grid states, then, in accordance with the decision Y, the neural network is trained in step 25 so that the threshold value T is fallen short of. If the diversity value E does not exceed the threshold value T, i.e. there is not an excessively large divergence between the two estimated grid states, then, in accordance with the decision N, the method proceeds directly to the final step 26.

The method 20 allows the neural network to be trained, in particular in the case of iterative repetition using many different training data, so that it delivers a very similar output to the output from the analytical method. In this case, however, the neural network is able to estimate a grid state very much more quickly than the analytical method needs for computing a grid state.

FIG. 4 shows an example of prediction of a grid state using the method 1 according to the invention. After the starting step 27, step 28 involves a future grid state being predicted. The prediction of the future grid state is taken as a basis for ascertaining measures to guarantee stability of the power distribution grid. The prediction is made for times 0 to 64, i.e. for a predefined time window of 12 hours in the future when the interval of time between the times is 15 minutes, and is ascertained by means of volt var control. That is to say that an analytical method is used for predicting the first 16 hours.

Subsequently, step 29 involves a prediction for further times 65 to 96 being ascertained on the basis of the previously trained neural network method. That is to say that machine learning is used for the last 8 hours in order to estimate the future grid state.

In step 30, predicted grid states are provided for all 96 times, i.e. for 24 hours in advance.

FIG. 5 shows an exemplary embodiment of a central computer arrangement 50 for predicting a grid state of an electrical power distribution grid 70. Measured values, e.g. voltage values U and current intensity values I, are sent from the power distribution grid 70 to a receiving device 51 as data telegrams 52. A state estimation device 54 is connected by way of a data communication connection 53 and designed to predict a future grid state. The prediction is transmitted to a monitoring device 57 by way of a data communication connection 53, the monitoring device taking the prediction of the future grid state as a basis for ascertaining measures to guarantee stability of the power distribution grid. The measures are transmitted to a transmitting device 58 by way of a data communication connection 53, the transmitting device creating control commands S, suitable for implementing the measures, for controllable equipment in the power distribution grid 70 and sending the control commands as data telegrams 59.

According to the invention, the state estimation device 54 contains a first prediction device 55 designed to create a prediction for a first portion of the multiple times. These may be the first 64 times within 16 hours, as in the example mentioned at the outset. The first prediction device 55 uses a voltage var control (VVC) method, i.e. an analytical method.

A second prediction device 56 is configured to ascertain a prediction for a second portion of the multiple times on the basis of a neural network method. These may be the last 32 times within 8 hours at the end of the time window of 24 hours, as in the example mentioned at the outset.

For this to work, the neural network method of the second prediction device 56 must first be trained to deliver very similar results to the analytical method of the first prediction device 55.

For this purpose, a first training device 61 is configured to create training data 60, wherein multiple contraventions of predefined threshold values for measured values of the electrical power distribution grid are simulated.

The first prediction device 55 takes the training data 60 as a basis for ascertaining a first prediction training dataset 62. The second prediction device 56 takes the same training data 60 as a basis for ascertaining a second prediction training dataset 63. The two prediction training datasets 62, 63 are transmitted to a comparison device 64.

The comparison device determines a diversity value E for a difference between the first and second prediction training datasets 62, 63. If the diversity value E exceeds a previously stipulated threshold value T, a second training device 65 is given the task of training the neural network for the second prediction device in such a way that the diversity value is reduced. The trained neural network 66 is transmitted to the second prediction device 56.

The invention claimed is:

1. A method for predicting a grid state of an electrical power distribution grid, which comprises the steps of:

receiving measured values via a central computer configuration from measuring devices, at least some of the measuring devices being arranged in substations;

using a state estimation device to predict a future grid state, wherein a grid state comprises an indication of the voltage absolute value or a voltage and the voltage angle or phase angle on each network section, wherein a prediction of the future grid state is taken as a basis for ascertaining measures to guarantee stability of the electrical power distribution grid, and wherein the prediction is made for multiple times within a predefined time window, the using step including the further substeps of:

using a first prediction device to ascertain a prediction for a first portion of the multiple times on a basis of an analytical method; and using a second prediction device to ascertain a prediction for a second portion of the multiple times on a basis of a neural network method;

wherein the second prediction device ascertains the prediction for the second portion faster than the first prediction device for the prediction for the first portion; and wherein the first portion comprises a longer time duration than the second portion.

2. The method according to claim 1, wherein a high-voltage grid is used for at least part of the electrical power distribution grid.

3. The method according to claim 1, wherein a medium-voltage grid is used for at least part of the electrical power distribution grid.

4. The method according to claim 1, which further comprises ascertaining a grid load for the prediction.

5. The method according to claim 1, which further comprises ascertaining energy production by producers of renewable energy for the prediction.

6. The method according to claim 1, which further comprises taking into consideration several hours in a future for the predefined time window, each of the multiple times being at time intervals of between 3 and 60 minutes.

7. The method according to claim 6, which further comprises taking into consideration 24 hours in the future for the predefined time window, each of the multiple times being at time intervals of 15 minutes.

8. The method according to claim 1, which further comprises:

using a first training device to create training data, wherein multiple contraventions of predefined threshold values for the measured values of the electrical power distribution grid are simulated; and taking the training data as a basis for using the first prediction device to ascertain a first prediction training dataset.

9. The method according to claim 8, which further comprises taking the training data as a basis for using the second prediction device to ascertain a second prediction training dataset, and in that a comparison device is used to ascertain a diversity value for a difference between the first and second prediction training datasets, wherein, if the diversity value exceeds a previously stipulated threshold value, a second training device is used to train a neural network for the second prediction device in such a way that the diversity value is reduced.

10. The method according to claim 1, wherein the analytical method is an analytical voltage var control method.

11. The method according to claim 1, wherein the neural network method is trained to deliver results substantially similar to the analytical method.

12. A non-transitory storage medium having computer executable code that when executed on a computer, carries out the method according to claim 1.

13. A central computer configuration for predicting a grid state of an electrical power distribution grid, the central computer configuration comprising:

a receiver configured to receive measured values from measuring sensors, at least some of said measuring sensors being arranged in substations; and a state estimation device configured to predict a future grid state, wherein a grid state comprises an indication of the voltage absolute value or a voltage and the voltage angle or phase angle on each network section, wherein a prediction of the future grid state is taken as a basis for ascertaining measures to guarantee stability of the electrical power distribution grid, and wherein the prediction is made for multiple times within a predefined time window, said state estimation device having a first prediction device configured to ascertain a prediction for a first portion of the multiple times on a basis of an analytical method, and a second prediction device configured to ascertain a prediction for a second portion of the multiple times on a basis of a neural network method;

wherein said second prediction device ascertains the prediction for the second portion faster than said first prediction device for the prediction for the first portion; and wherein the first portion comprises a longer time duration than the second portion.

14. The central computer configuration according to claim 13, wherein said state estimation device is configured to ascertain a grid load for the prediction.

15. The central computer configuration according to claim 13, wherein said state estimation device is configured to ascertain energy production by producers of renewable energy for the prediction.

16. The central computer configuration according to claim 13, further comprising:

a first training device configured to create training data, wherein multiple contraventions of predefined threshold values for the measured values of the electrical power distribution grid are simulated, and the training data are taken as a basis for using said first prediction device to ascertain a first prediction training dataset.

17. The central computer configuration according to claim 16, wherein said second prediction device is configured to take the training data as a basis for ascertaining a second prediction training dataset;

further comprising a comparison device configured to ascertain a diversity value being a difference between the first and second prediction training datasets; and further comprising a second training device configured so as, if the diversity value exceeds a previously stipulated threshold value, to train a neural network for said second prediction device in such a way that the diversity value is reduced.

18. The central computer configuration according to claim 13, wherein the analytical method is an analytical voltage var control method.

* * * * *